(12) United States Patent
Gibberd et al.

(10) Patent No.: US 8,517,639 B2
(45) Date of Patent: Aug. 27, 2013

(54) INSTALLATION OF UNDERWATER ANCHORAGES

(75) Inventors: George Gibberd, Bristol (GB); Christopher Huxley-Reynard, Bristol (GB)

(73) Assignee: Tidal Generation Limited, Bristol (GB)

( * ) Notice: Subject to any disclaimer, the term of this patent is extended or adjusted under 35 U.S.C. 154(b) by 130 days.

(21) Appl. No.: 12/089,839

(22) PCT Filed: Oct. 13, 2006

(86) PCT No.: PCT/GB2006/003822
§ 371 (c)(1), (2), (4) Date: Apr. 10, 2008

(87) PCT Pub. No.: WO2007/042830
PCT Pub. Date: Apr. 19, 2007

(65) Prior Publication Data
US 2008/0226398 A1    Sep. 18, 2008

(30) Foreign Application Priority Data

Oct. 14, 2005   (GB) .................................. 0520891.3
Nov. 28, 2005  (GB) .................................. 0524132.8

(51) Int. Cl.
*E02D 5/40*   (2006.01)
*E02D 27/52*  (2006.01)

(52) U.S. Cl.
USPC ........................... 405/227; 405/224; 405/225

(58) Field of Classification Search
USPC ................ 405/222, 223, 224, 225, 226, 227, 405/232, 233, 248, 256, 257; 175/5, 171
See application file for complete search history.

(56) References Cited

U.S. PATENT DOCUMENTS

| 3,282,356 | A | * | 11/1966 | Paulson et al. ................. 175/103 |
| 3,921,410 | A | * | 11/1975 | Philo ............................... 405/232 |
| 4,171,176 | A | * | 10/1979 | Yamada ......................... 405/257 |
| 4,818,149 | A | * | 4/1989 | Kuehn ............................ 405/228 |
| 4,904,119 | A | | 2/1990 | Legendre et al. |
| 2003/0141111 | A1 | * | 7/2003 | Pia .................................. 175/57 |

FOREIGN PATENT DOCUMENTS

| EP | 0 520 544 B1 | 8/1995 |
| GB | 2 011 981 A | 7/1979 |
| GB | 2 179 691 A | 3/1987 |
| JP | 56-156004 (A) | 2/1981 |
| JP | 63-217016 (A) | 9/1988 |

OTHER PUBLICATIONS

International Search Report for PCT/GB2006/003822.

(Continued)

*Primary Examiner* — David Bagnell
*Assistant Examiner* — Benjamin Fiorello
(74) *Attorney, Agent, or Firm* — Oliff & Berridge, PLC

(57) ABSTRACT

A method of securing a load bearing structure to the bed of a sea, river or estuary. The method comprises placing the load bearing structure on the bed; forming a pile-receiving hole in the bed by means of drilling equipment which is connected to a surface vessel by flexible lines only so that the weight of the drilling equipment is supported by the bed, the drilling equipment being guided by the load bearing structure, and the load bearing structure resisting any non-vertical loads imparted to the drilling equipment; and withdrawing the drilling equipment and installing an attachment pile within the formed hole.

28 Claims, 7 Drawing Sheets

(56) References Cited

OTHER PUBLICATIONS

GB Search Report for Application No. GB0524132.8.
English translation of abstract of JP 56156004 (A).
Data supplied by Espacenet's database indicating that abstract not available for JP 63217016 (A) and that English translation of abstract of corresponding document: EP 0265344 (A1) is available.
Office Action Summary corresponding to Japanese Patent Application No. 2008-535103, dated Jun. 21, 2011.

* cited by examiner

INSTALLATION OF UNDERWATER ANCHORAGES

This invention relates to a method of securing a load bearing structure to the bed of a sea, river or estuary, and is particularly, although not exclusively, concerned with the installation of anchorages for structures such as power generating equipment using water current energy. The present invention also relates to a load bearing structure in combination with drilling equipment for use in securing the load bearing structure.

BACKGROUND

It is becoming clear that many sites for water current energy systems comprise hard or rocky beds. Existing methods of drilling underwater rock sockets typically require a fixed drilling platform such as a jack-up vessel. This becomes expensive in water depths of more than approximately 30 m because it can no longer be carried out using relatively cheap and available near-shore construction jack-up vessels, but instead requires expensive specialist offshore vessels such as mobile drilling units (MDUs) or dynamically positioned (DP) drilling ships. It is possible that dedicated installation jack-ups could be developed for ocean energy installations; however, these would need to be capable of standing in water up to 70 m deep in order to capture a significant proportion of the UK tidal energy resource. This is a significant extension of current operating envelopes, and there are currently no indications that this could be achieved cost-effectively.

It is known to drill into rock using rotary drilling or percussive drilling.

The problems associated with using a conventional large diameter rotary drill are firstly that there is little if any of such equipment capable of operation underwater, and secondly that the equipment is large and relatively complex, and requires to be mounted on a structure which can react the large torques generated. The drill string is heavy and the vessel required to deploy it is correspondingly large.

Fluid-operated percussive drilling equipment is existing technology and has been used for onshore and offshore drilling. In the offshore environment, however, it has only previously been deployed using surface-breaking rigid drill stringers operated from stable drilling stringers.

There is therefore needed a cost-effective means of securing anchorages, moorings or foundations to the bed of a body of water.

SUMMARY OF INVENTION

In a first aspect of the present invention, there is provided a method of securing a load bearing structure to the bed of a sea, river or estuary, the method comprising the steps of: placing the load bearing structure on the bed; forming a pile-receiving hole in the bed by means of drilling equipment which is connected to a surface vessel by flexible lines only so that the weight of the drilling equipment is supported by the bed, the drilling equipment being guided by the load bearing structure, and the load bearing structure resisting any non-vertical loads imparted to the drilling equipment; and withdrawing the drilling equipment and installing an attachment pile within the formed hole.

In a second aspect of the present invention, there is provided, in combination, a load bearing structure for installation on the bed of a sea, river or estuary, and drilling equipment for use in the installation of the load bearing structure, the drilling equipment being adapted for deployment from a surface vessel by flexible lines only, the load bearing structure being provided with guide means for guiding the drilling equipment during a drilling operation on the bed, the guide means and the drilling equipment cooperating with each other to permit vertical displacement of the drilling equipment relative to the guide means but to resist non-vertical loads imparted to the drilling equipment.

A method in accordance with the present invention provides a cost-effective means of carrying out drilling in cases where beds are hard or rocky. Such a method can be employed to install a wide range of piles, from shallow-embedment "shear keys" to deeper pile embedments capable of carrying uplift forces. The technique is generic and therefore suitable for any type of seabed anchorage or mooring; however, the main applications discussed below are foundations for ocean and water current energy systems, for example wave, tidal stream and offshore wind energy conversion systems.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION OF THE PREFERRED EMBODIMENTS

Figure 1A:
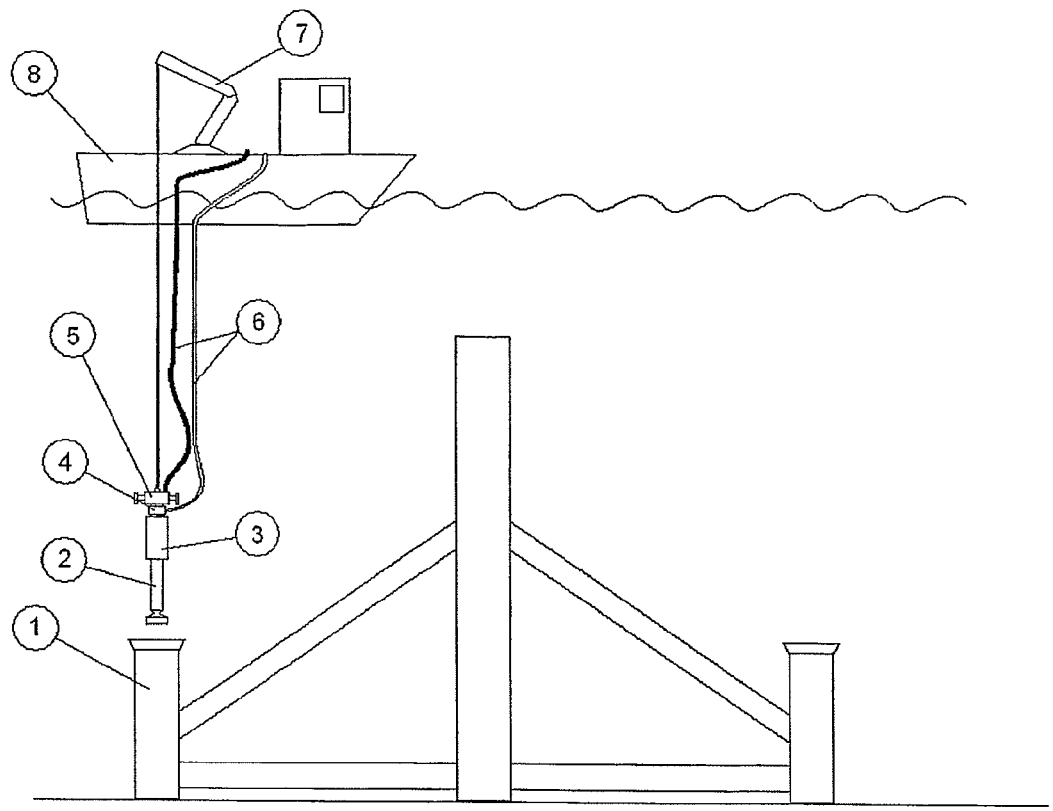
FIGS. 1a and 1b show a method of deployment of a drilling system and attachment pile to secure a support structure to the seabed.

Referring to FIG. 1a, a support structure is positioned on the bed of a body of water. The support structure comprises a central column 30 stabilized by support feet in the form of hollow members 1. In an alternative embodiment there may be only one hollow member, which may be positioned substantially centrally within the support structure.

A workboat 8 lowers a drill string down into one of the hollow members 1. The drill string is an axial assembly comprising all the equipment necessary to operate the drill, such that all equipment may be recovered by the workboat 8 in a single lift after drilling. This may include, but is not restricted to, weights, drive motors for slow indexing of the drill bit, power swivel to receive the power for the drill from an umbilical whilst allowing the drill to index around, and guidance channels to control the exhaust fluid velocity to ensure the removal of drillings.

In the embodiment shown in FIG. 1a, the drill string is a percussive drilling system. Thus the drill string is made up of a percussion drill 2, a weight 3, an air swivel 4 and a motor 5 to rotate the percussion drilling system.

Percussive drilling techniques make use of the inertia of an axially oscillating heavy piston striking the drill bit to provide the crushing forces necessary to chip off and remove rock fragments. The drill strings required are much lighter than rotary drilling equipment of equivalent power, they do not require significant torque reaction, and are designed for operation underwater.

As it is lowered, the full weight of the drill string is supported by a cable 32 from a deck-mounted crane 7 on the workboat 8. Pneumatic, hydraulic, electric or any other connections necessary for the drill string to operate correctly are made between the drill string and the workboat 8 by flexible umbilicals 6. The umbilicals 6 are fitted with helical vortex-induced vibration suppressors and/or joined together at intervals in a manner so as to provide damping against loads induced by currents.

As will be described in more detail below, the drill string is lowered through the guide provided by the hollow member 1 and comes to rest on the bed of the body of water. Thus, during drilling, the load of the drill string is supported by the bed of the body of water.

Figure 1B:
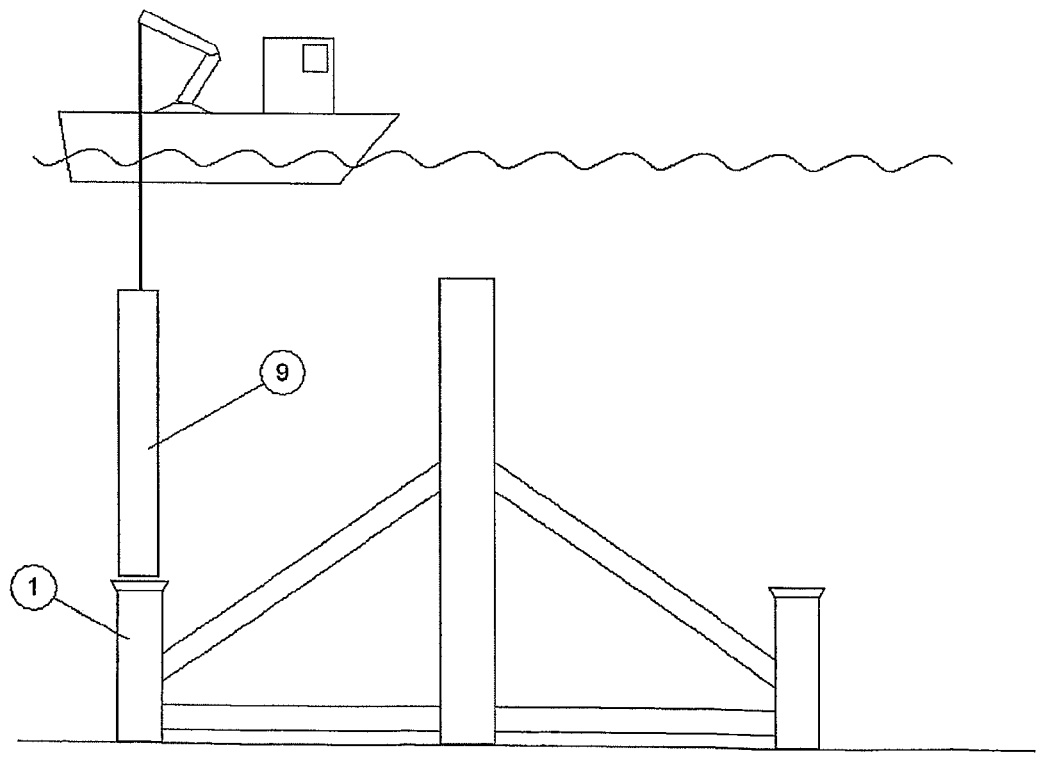

Once a hole of the required depth has been drilled as described above, the drill string is retrieved from the bed. As shown in FIG. 1b, an attachment pile 9 is lowered from the workboat 8 into the hole through the hollow member 1.

Figure 2A:
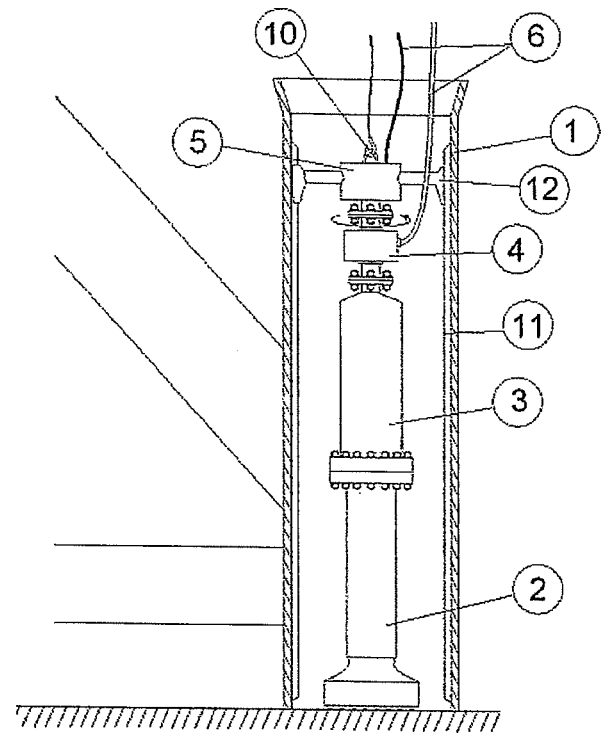
FIGS. 2a to 2c show the support structure at different stages of the securing process.

Referring to FIG. 2a, the hollow member 1 has been cross-sectioned to show the drill string in position on the bed, ready to drill.

The percussion drill 2 rests on the bed such that the weight of the drill string is taken off the crane hook 10. Additional weight 3 has been attached on top of the percussion drill 2 to enhance the percussive effect of the drill. The drill string is turned by the motor 5, and air to power the percussion drill 2 is provided by the air swivel 4 from one of the umbilicals 6. Another of the umbilicals 6 may comprise an electric cable to supply power to the motor 5.

The drill string has torque arms 12 that engage with guide vanes 11 on the inside of the hollow member 1. The guide vanes 11 support the reaction torque of the motor 5, so that the drill operates correctly.

Figure 2B:
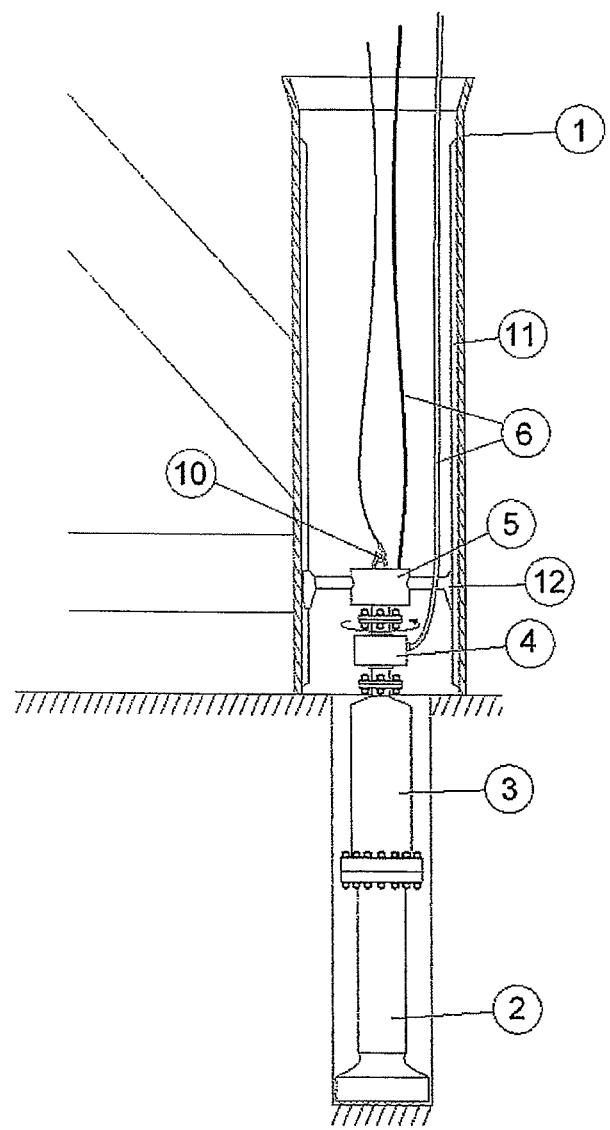

In the condition shown in FIG. 2b, the drill 2 has completed a hole in the seabed. As the depth of the hole increases, the motor torque arms 12 slide down the guide vanes 11. The drillings are ejected out of the top of the hollow member 1 to the environment. Once the required depth of hole has been drilled, the drill string can be lifted out by the deck-mounted crane on the surface (see FIG. 1a).

Figure 2C:
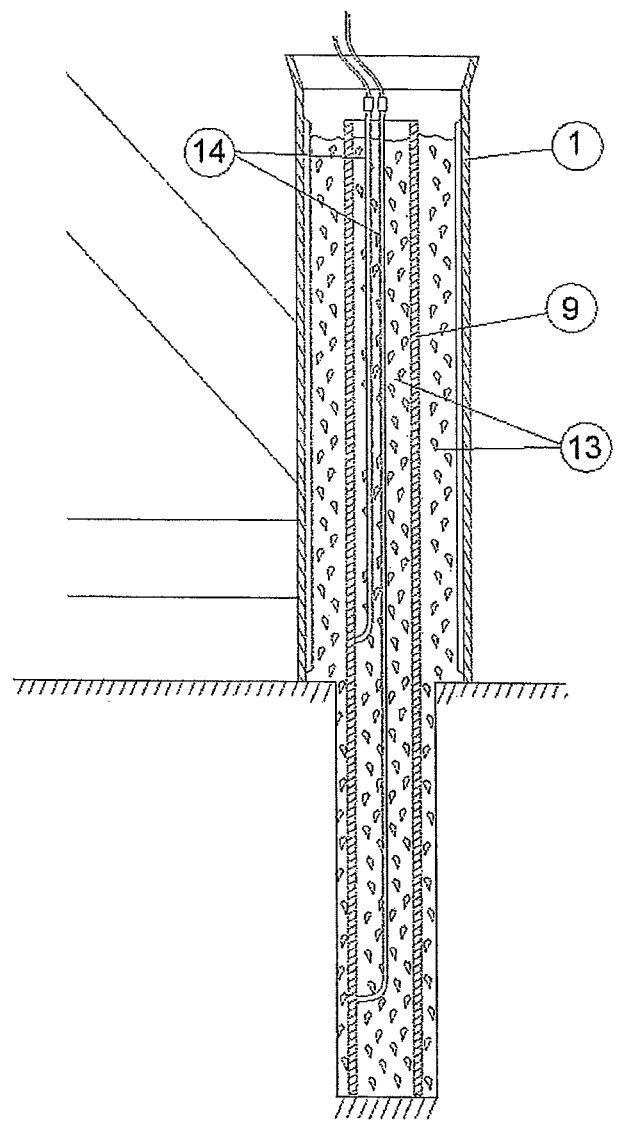

Referring to FIG. 2c, the drill string has been removed and the attachment pile 9 has been lowered into the hole from the surface (see also FIG. 1b). The attachment pile 9 is a steel cylinder fitted with grout tubes 14 which are attached to grout lines running to the surface. Grout is pumped down these tubes to fill the annulus between the attachment pile 9 and the hollow member 1 on the one hand, and the annulus between the attachment pile 9 and the inside of the hole on the other hand. Grout is also supplied to the inside 13 of the attachment pile. The grout lines are then detached and retrieved to the surface vessel 8.

In an alternative embodiment, the attachment pile 9 is attached to the support structure by mechanical means, for example bolts, welding or expanding mandrels.

Figure 3A:
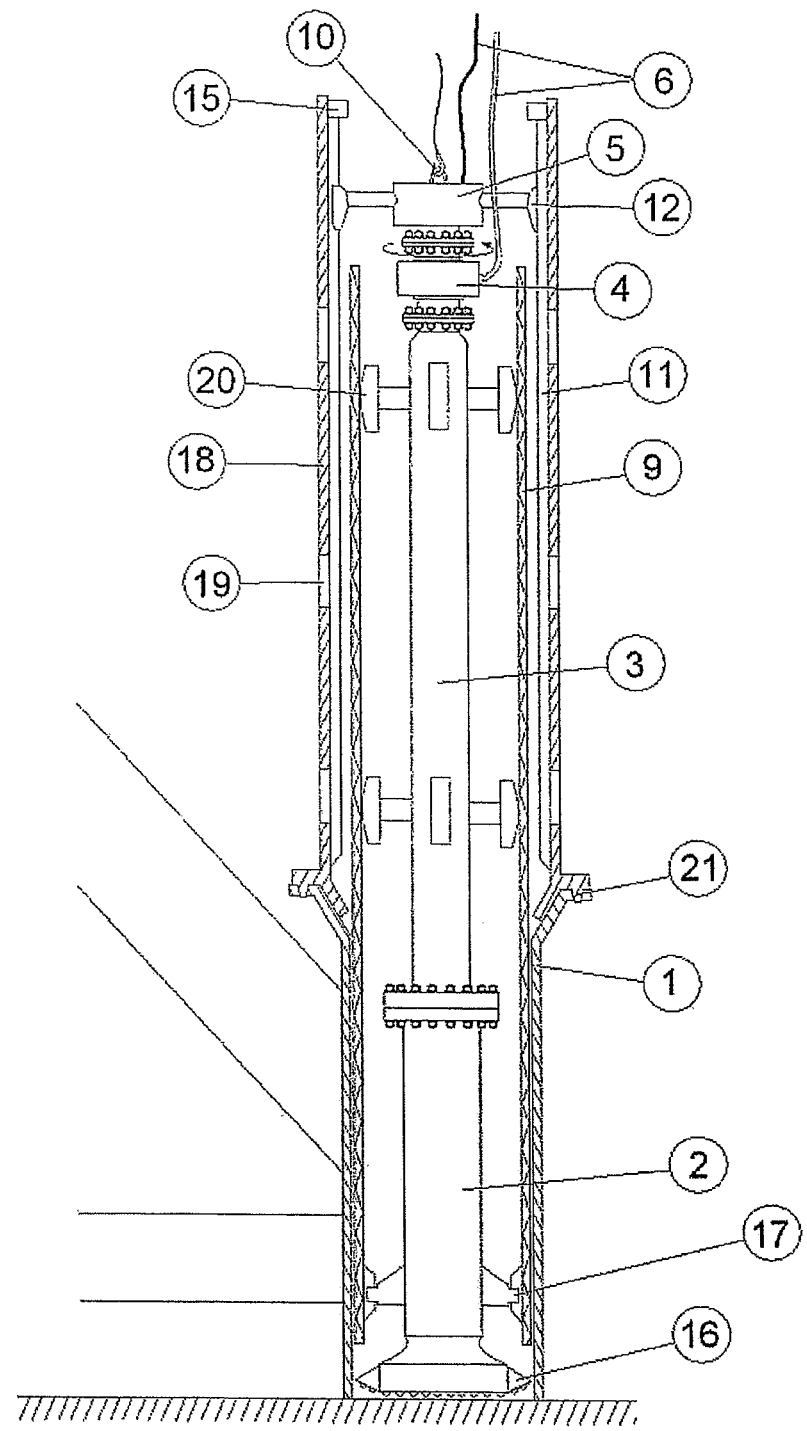
FIGS. 3a to 3c correspond to FIGS. 2a to 2c but show an alternative securing process.
Figure 3B:
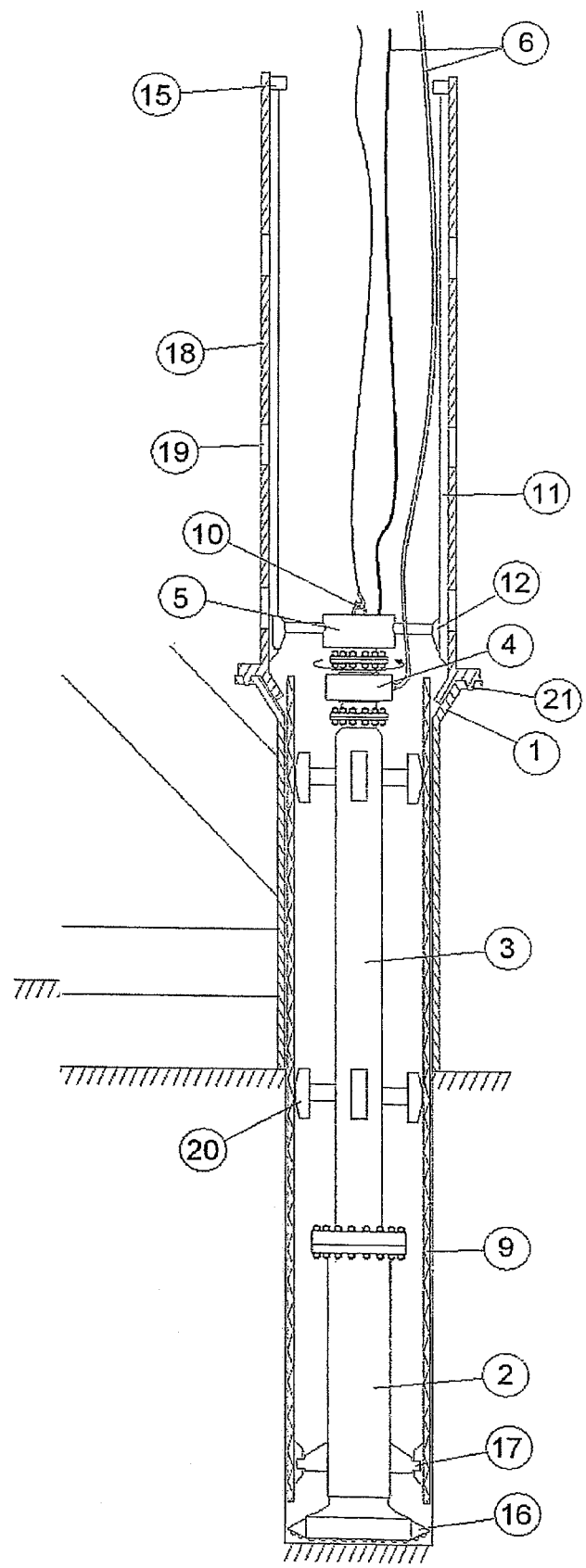
Figure 3C:
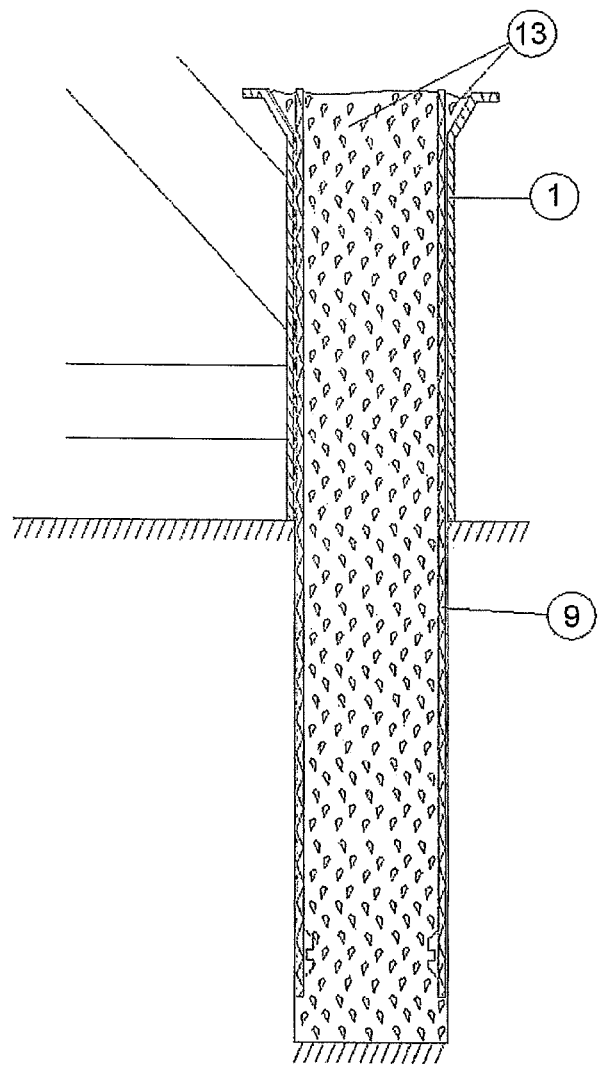

FIGS. 3a to 3c show an alternative process, although the same reference numbers have been used for similar components as in FIGS. 2a to 2c. Referring to FIG. 3a, the hollow member 1 has been cross-sectioned to show a different drill string arrangement resting on the seabed, ready to drill. The percussion drill 2 rests on the seabed, with the weight taken off the crane hook 10. In this embodiment, the attachment pile 9 forms part of the drill string, and fits inside the hollow member 1, aligning the drill string vertically. The attachment pile 9 is attached to the percussion drill 2, such that as the drilling process takes place, the attachment pile 9 is pulled into the hole at the same time as the hole is created.

The attachment pile 9 is attached to the percussion drill 2 at its base using a remotely detachable fitting 17. This fitting 17 could be a hydraulically or pneumatically actuated pin which engages with a female fitting fixed to the inside wall of the attachment pile 9. Those skilled in the art will be able to think of alternative fittings that are to be considered within the scope of the present invention.

The percussion drill 2 incorporates an under-reamer 16, which can be deployed for drilling, but is radially retractable in order to allow the drill string to be removed. Thus, during drilling the under-reamer 16 extends the diameter of the drilled hole, so that the attachment pile 9 can fit easily inside it. After drilling, the under-reamer 16 retracts radially so the drill string can be removed from inside and underneath the edges of the attachment pile 9.

As in the process described with reference to FIGS. 2a to 2c, additional weight 3 is attached to the percussion drill 2. Guides 20 keep the drill string aligned vertically within the attachment pile 9. As in the first embodiment, the drill string is turned by the motor 5, and air to power the percussion drill 2 is provided via the air swivel 4 from an umbilical 6. Again, a further umbilical 6 can be used to power the motor 5 as necessary.

In order to prevent the hollow member 1 from being excessively tall, a releasable extension 18 is used to extend the height of the hollow member 1. The extension 18 is attached to the top of the hollow member 1 using a tapered fitting 21. The torque arms 12 engage with guide vanes 11 on the inside of the extension 18. The guide vanes 11 are fitted with stops 15 at the top of the extension 18, so that when the drill string is removed from the hollow member 1, the torque arms 12 abut against the stops 15 and the extension 18 is retrieved along with the drill string. This embodiment is especially useful when a deep embedment hole is required.

Referring to FIG. 3b, the drill string has made a hole in the seabed by turning the motor 5 and powering the percussion drill 2. As the drill string makes the hole the motor torque arms 12 slide down the guide vanes 11 on the inner wall of the extension 18. The drillings are ejected out of the top of the attachment pile 9, from where they are ejected to the environment either out of the top of the hollow member 1 or through holes 19 made in the wall of the extension 18.

Once the required depth of hole has been drilled, the under-reamer 16 is retracted and the remotely detachable fitting 17 is released. The drill string can then be lifted out vertically by a deck-mounted crane on the surface. As described above, the extension 18 is also lifted out by virtue of the stops 15.

Referring to FIG. 3c, the drill string has been removed, leaving the attachment pile 9 in place. Grout is pumped into the annulus between the attachment pile 9 and the inside of the hollow member 1 and the inside of the hole, also flowing inside the attachment pile itself. This could be achieved using a similar grout-tube arrangement as shown in FIG. 2c. Alternatively grout could be pumped through grout tubes that run inside the tubular framework of the support structure through the wall of the hollow member (not shown). One skilled in the art may be able to think of further alternatives without departing from the scope of the invention.

There is therefore described a method and equipment for installing underwater anchorages to the bed of a body of water. The present invention has several advantages:

1. it can be used to install piles of sufficient embedment to carry significant uplift forces as well as shear and other loads, and is therefore suitable for all types of anchorages and moorings, including foundations for many types of ocean and water current energy converters;
2. it can be deployed in any water depth;
3. the drill string is deployed using flexible umbilicals instead of a rigid drill string, which eliminates the need for an expensive drill ship, DP vessel, or heave-compensated crane. Installation can be achieved using smaller, cheaper, more readily available non-specialist vessels, which makes the process considerably quicker and more flexible;
4. the drill string is relatively light (typically only 10 tonnes or so for holes up to 1.2 m diameter), which makes for ease of handling and rapid deployment. The deployment vessel requires a crane with sufficient capacity only to lower the drill string to the bed;
5. it makes use of the foundation structure as a drilling template, removing the need for separate templates or alignment devices. This is achievable because of the low reaction loads and minimal guidance requirements of the drill;
6. owing to the deployment of the drill string inside the template (for example inside a hollow member or an attachment pile) it is well protected from water currents and, unlike a conventional surface-breaking stringer, is not exposed to drag loads and vortex-induced vibration (VIV). This technique is therefore particularly advantageous for installing foundations for water current energy systems and wave energy systems;
7. if necessary, the drilling operation can quickly be aborted at any stage in the process simply by raising the drill string to the surface. Drilling can subsequently be restarted by lowering the drill string back down into the hole and using the template guides to pick up on the previous drilling.

The invention claimed is:

1. A method of securing a load bearing structure to a bed of a sea, river or estuary, the method comprising:
    a) placing the load bearing structure on the bed;
    b) forming a pile-receiving hole in the bed by means of drilling equipment which is deployed from a surface vessel and is connected to that surface vessel by flexible lines only so that the entire weight of the drilling equipment is supported directly on the bed, the drilling equipment incorporating a drill which is guided axially solely by the load bearing structure, and the load bearing structure resisting any rotational loads imparted to the drilling equipment; and
    c) withdrawing the drilling equipment and installing an attachment pile within the formed hole.

2. The method as claimed in claim 1, in which, in step (c), the drilling equipment is recovered in a single lift by the surface vessel.

3. The method as claimed in claim 1, wherein the attachment pile is installed to a depth sufficient to enable the attachment pile to resist all loads on the load bearing structure.

4. The method as claimed in claim 1, wherein the attachment pile is installed in such a manner that the attachment pile resists predominantly shear loads.

5. The method as claimed in claim 1, wherein the attachment pile is secured to the load bearing structure by grouting after installation.

6. The method as claimed in claim 1, wherein the drilling equipment is percussive drilling equipment.

7. A method of securing a load bearing structure to a bed of a sea, river or estuary, the method comprising:
    a) placing the load bearing structure on the bed;
    b) attaching drilling equipment to an attachment pile;
    c) locating the attachment pile and drilling equipment on the bed;
    d) forming a pile-receiving hole in the bed by means of the drilling equipment, the drilling equipment being connected to a surface vessel by flexible lines only so that the entire weight of the drilling equipment is supported solely by the bed, the drilling equipment being guided axially, solely by one of the load bearing structure, or an extension thereof, and the one of the load bearing structure or the extension resisting any rotational loads imparted to the drilling equipment; and
    e) withdrawing the drilling equipment from the pile-receiving hole and attachment pile.

8. The method as claimed in claim 7, wherein the attachment pile is hollow and wherein the drilling equipment is positioned within the attachment pile during the formation of the hole.

9. The method as claimed in claim 8, wherein the drilling equipment has a radially retractable drill bit whereby the drilling equipment can be withdrawn from within the attachment pile after installation of the attachment pile.

10. The method as claimed in claim 7, in which, in step (e), the drilling equipment is recovered in a single lift by the surface vessel.

11. The method as claimed in claim 7, wherein the attachment pile is installed to a depth sufficient to enable the attachment pile to resist all loads on the load bearing structure.

12. The method as claimed in claim 7, wherein the attachment pile is installed in such a manner that the attachment pile resists predominantly shear loads.

13. The method as claimed in claim 7, wherein the attachment pile is secured to the load bearing structure by grouting after installation.

14. The method as claimed in claim 13, wherein guide vanes are carried on a separable, hollow, non-load bearing portion of the structure with stops located at one end thereof, adjacent to respective ends of the guide vanes, wherein as a drill string is moved axially in a first direction relative to the structure, the stops engage the torque arms causing the non-load bearing portion to separate from the structure.

15. The method as claimed in claim 14, wherein the drill string carries radially extending alignment guides which slidably engage an attachment pile releasably coupled to the drill string.

16. In combination, a load bearing structure for installation on the bed of a sea, river or estuary, and drilling equipment for use in the installation of the load bearing structure, the drilling equipment being adapted for deployment from a surface vessel by flexible lines only, such that, during a drilling operation, the entire weight of the drilling equipment is supported by the bed, the load bearing structure being provided with axial guide means for guiding a drill of the drilling equipment during a drilling operation on the bed, the guide means and the drilling equipment cooperating with each other so as to permit axial displacement of the drill relative to the guide means and so as to resist rotational loads imparted to the drilling equipment, the guide means providing sole guidance to the drill during such a drilling operation.

17. The combination as claimed in claim 16, wherein the drilling equipment comprises a single operable unit.

18. The combination as claimed in claim 16, wherein the load bearing structure is adapted to support a power generating apparatus.

19. The combination as claimed in claim 16, wherein the load bearing structure is an open framework having one or more hollow members, the guide means being constituted by the interior of at least one of the hollow members.

20. The combination as claimed in claim 19, wherein the hollow member is a central member of the load bearing structure.

21. The combination as claimed in claim 19, wherein the guide means comprises internal vanes provided within the respective hollow member.

22. The combination as claimed in claim 1, wherein the drilling equipment is provided with arms which engage the vanes.

23. The combination as claimed in claim 22, wherein the hollow member comprises a support foot for supporting the load bearing structure on the bed.

24. The combination as claimed in claim 23, wherein the hollow member includes a releasable extension fitted to the support foot, the vanes being provided in the extension.

25. The combination as claimed in claim 24, wherein the walls of the releasable extension comprise slots to allow drillings to pass out and exhaust to the environment.

26. The combination as claimed in claim 16, wherein the drilling equipment is percussive drilling equipment.

27. An apparatus comprising:
 a load bearing structure, hollow in part, for installation on a bed of a sea, river or estuary, and
 drilling equipment for use in the installation of the load bearing structure, the drilling equipment being adapted for deployment from a surface vessel by flexible lines only, such that, during a drilling operation, the entire weight of the drilling equipment is supported by the bed, the load bearing structure being provided with rigid, internal, axial guide vanes for guiding a drill of the drilling equipment during a drilling operation on the bed, the guide vanes and torque arms that extend from the drilling equipment slidably engage each other so as to permit axial displacement of the drill relative to the guide means and so as to resist rotational loads imparted to the drilling equipment.

28. The apparatus as claimed in claim 27, wherein
 the load bearing structure includes a releasable, elongated, hollow extension and wherein the guide vanes are located in the extension, and
 walls of the releasable extension comprise slots to allow drillings to pass out and exhaust to the environment.

* * * * *